FIGURE 1. INFRARED ABSORPTION SPECTRUM OF ZORBONOMYCIN HYDROCHLORIDE.

ULTRAVIOLET ABSORPTION SPECTRUM OF ZORBONOMYCIN HYDROCHLORIDE.

OPTICAL ROTARY DISPERSION OF ZORBONOMYCIN HYDROCHLORIDE.
(IN WATER)

OPTICAL ROTARY DISPERSION OF ZORBONOMYCIN HYDROCHLORIDE.
(IN METHANOL)

FIGURE 5. THIN-LAYER CHROMATOGRAPHY OF ZORBONOMYCIN HYDROCHLORIDE AND PHLEOMYCIN.

INFRARED ABSORPTION SPECTRUM OF COPPER-FREE ZORBONOMYCIN HYDROCHLORIDE.

NUCLEAR MAGNETIC RESONANCE SPECTRUM OF COPPER-FREE ZORBONOMYCIN HYDROCHLORIDE.

INFRARED ABSORPTION SPECTRUM OF ZORBONOMYCIN B HYDROCHLORIDE.

THIN-LAYER CHROMATOGRAPHY OF ZORBONOMYCIN B HYDROCHLORIDE AND PHLEOMYCIN.

NUCLEAR MAGNETIC RESONANCE SPECTRUM OF COPPER-FREE ZORBONOMYCIN B HYDROCHLORIDE.

United States Patent Office 3,814,796
Patented June 4, 1974

---

3,814,796
ANTIBIOTICS ZORBONOMYCIN AND ZORBONOMYCIN B AND PROCESS FOR THE PREPARATION THEREOF
Alexander D. Argoudelis, Portage, Malcolm E. Bergy, Kalamazoo, and Thomas R. Pyke, Portage, Mich., assignors to The Upjohn Company, Kalamazoo, Mich.
Filed Oct. 9, 1969, Ser. No. 865,096
Int. Cl. A61k 21/00
U.S. Cl. 424—117          11 Claims

ABSTRACT OF THE DISCLOSURE

Antibiotics zorbonomycin and zorbonomycin B producible by culturing *Streptomyces bikiniensis* var. *zorbonensis* var. nova. in an aqueous nutrient medium. These antibiotics inhibit the growth of *Staphylococcus aureus* and other microorganisms, and can be used to inhibit such microorganisms in various environments.

BRIEF SUMMARY OF THE INVENTION

Zorbonomycin (U–30,604E) and zorbonomycin B (U–32,166E) are producible by culturing a zorbonomycin-producing actinomycete in an aqueous nutrient medium. These compounds have the property of adversely affecting the growth of various Gram-positive and Gram-negative bacteria, for example, *Staphylococcus aureus*, *Escherichia coli*, *Klebsiella penumoniae*, *Salmonella typhosa*, and *Aerobacter aerogenes*. Zorbonomycin is also active against various fungi, for example, *Geotrichum sp.*, *Blastomyces dermatitidis*, *Coccidiodes immitis*. *Cryptococcus neoformans*, *Histoplasma capsulatum*, *Sporotrichum schenkii*, *Monosporium apiospermum*, *Trichophyton rubrum*, and *Trichophyton violaceum*. Accordingly, the novel antibiotics of the subject invention can be used alone or in combination with other antibiotic agents to prevent the growth of, or reduce the number of bacteria and fungi, as disclosed above, in various environments. For example, they can be used as disinfectants on various dental and medical equipment contaminated with *Staphylococcus aureus*. Zorbonomycin can be used as an anti-fungal agent in industrial preservatives, for example, as an anti-fungal rinse for laundered clothes, and for impregnating papers and fabrics. Also, it can be used for suppresing the fungal growth of sensitive organisms in plate assays and other biological media.

DETAILED DESCRIPTION

Figure 1:
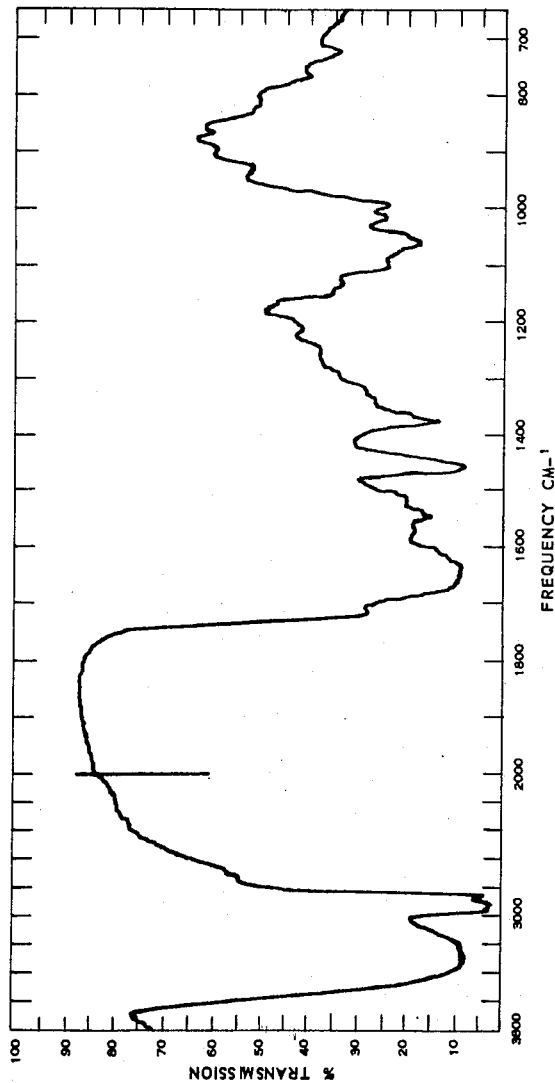
FIG. 1, infrared absorption spectrum of zorbonomycin hydrochloride.

Chemical and physical properties of zorbonomycin as the hydrochloride salt

Elemental analysis: Average found values: C, 42.48; H, 5.92; N, 16.16; S, 3.81; Cu, 3.86; Cl, 4.26; O (by diff.), 23.51.

Molecular weight: 677 (determined by vapor pressure measurement in absolute methanol).

Molecular formula:
1. Based on sulfur analysis

$$C_{59.4}H_{99.4}N_{19.4}O_{24.6}S_2Cl_2Cu$$

2. Based on chlorine analysis

$$C_{59}H_{98.6}N_{19.2}O_{24.4}S_2Cl_2Cu$$

3. Based on nitrogen analysis

$$C_{58.1}H_{97.3}N_{19}O_{24}S_{1.96}Cl_{1.98}Cu$$

Based on the above, the following empirical formula is proposed:

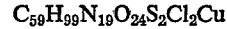
$$C_{59}H_{99}N_{19}O_{24}S_2Cl_2Cu$$

Optical rotation: $[\alpha]_D^{25} = +247°$ (c., 0.58, water).

Solubilities: Zorbonomycin·HCl is highly soluble in water and methanol. It has limited solubility in absolute ethanol and other lower alcohols. It is relatively insoluble in acetone, ethyl acetate, chlorinated hydrocarbons, and saturated hydrocarbon solvents.

Infrared spectrum: The infrared absorption spectrum of zorbonomycin hydrochloride suspended in mineral oil mull is reproduced in FIG. 1 of the drawing. Zorbonomycin hydrochloride gives bands of the following wave lengths expressed in reciprocal centimeters:

| | |
|---|---|
| 3300 (S) | 1150 (M) |
| 2930 (S) (oil) | 1132 (M) |
| 2840 (S) (oil) | 1100 (S) |
| 1718 (S) | 1060 (S) |
| 1650 (S) | 1015 (M) |
| 1575 (S) | 990 (M) |
| 1550 (S) | 925 (M) |
| 1520 (S) | 890 (W) |
| 1460 (S) (oil) | 863 (W) |
| 1375 (S) (oil) | 808 (M) |
| 1290 (M) | 765 (M) |
| 1250 (M) | 720 (M) |
| 1210 (M) | |

Infrared absorption band intensities throughout this disclosure are indicated as S, M, and W, respectively, and are approximated in terms of the backgrounds in the vicinity of the bands. An S band is of the same order of intensity as the strongest in the spectrum; M bands are between one-third and two-thirds as intense as the strongest band, and W bands are less than one-third as intense as the strongest band. These estimates are made on the basis of a percent transmission scale. Also, the designation sh appearing after a band reading denotes a "shoulder" type of band.

Ultraviolet spectrum: Zorbonomycin hydrochloride has the following U.V. absorption spectrum in methanol:

| λMax. (mμ): | a |
|---|---|
| 244 | 16.61 |
| 290.5 (sh—shoulder) | 5.52 |
| 298 | 5.73 |
| 309 (sh) | 5.39 |
| 600 | 0.079 |

Figure 2:
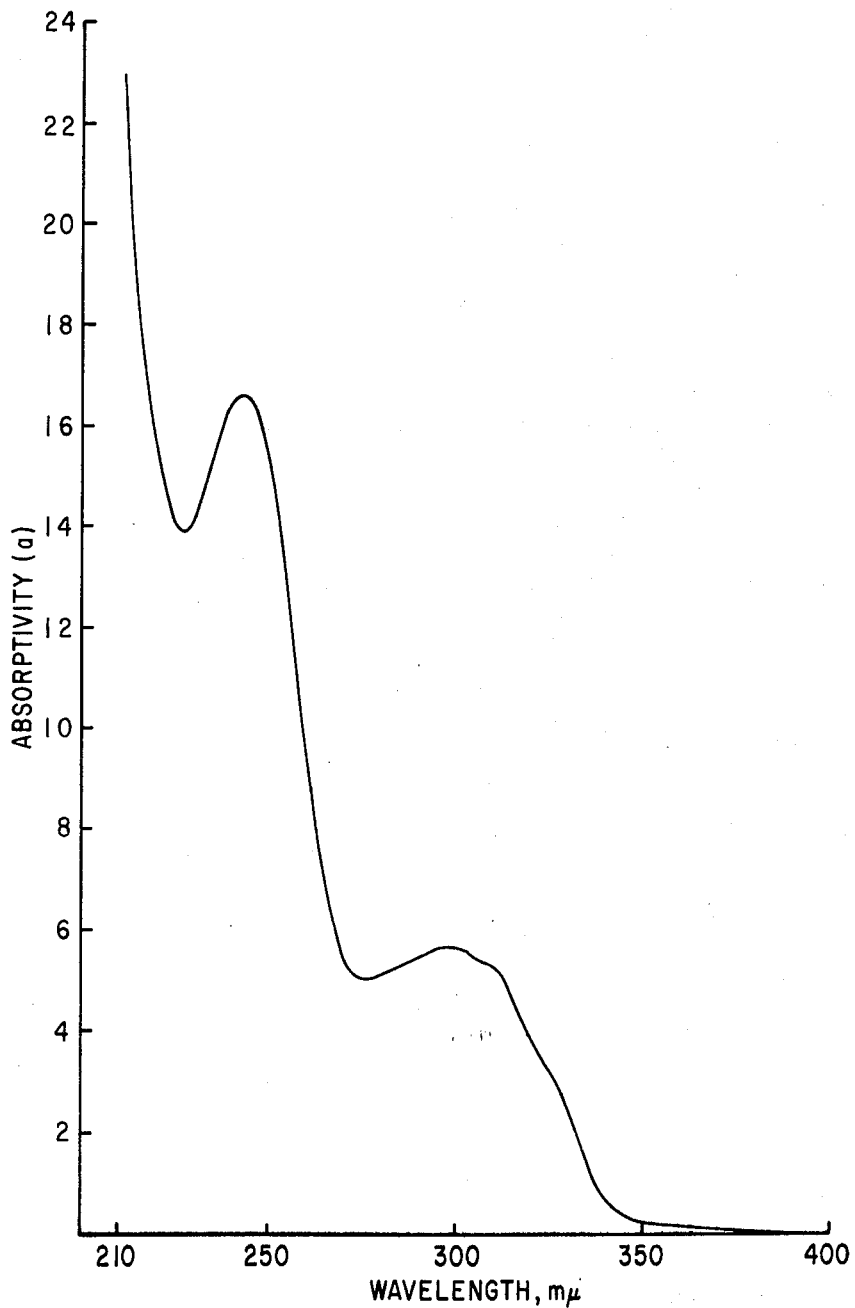
FIG. 2, ultraviolet absorption spectrum of zorbonomycin hydrochloride.

The U.V. absorption spectrum of zorbonomycin, in methanol, is also shown in FIG. 2 of the drawing.

Titration: In water with HCl or KOH: indeterminate. In glacial acetic acid with $HClO_4$=equivalent weight =595.

Figure 3:
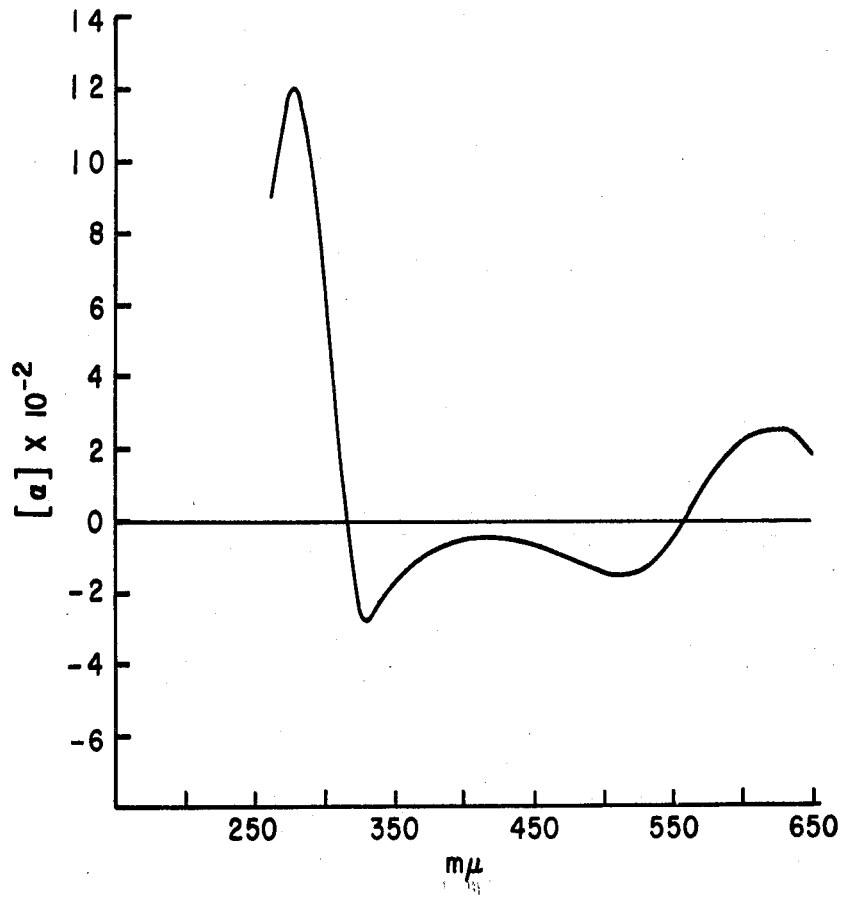
FIG. 3, optical rotary dispersion curve or zorbonomycin hydrochloride in water.

Optical rotary dispersion: Zorbonomycin hydrochloride has characteristic optical rotary dispersion curves as shown in FIGS. 3 (in water) and 4 (in methanol) of the drawing.

Thin-layer chromatography: Zorbonomycin hydrochloride has a characteristic chromatographic pattern as shown by thin-layer chromatography in FIG. 5 of the drawing. The thin-layer chromatography was conducted on MN-Polygram Cellulose 300 (Sold by Brinkmann Instruments, Inc.) using 0.1 M aqueous $NH_4Cl$ as the developing solvent. Zorbonomycin is clearly distinguishable from the phleomycin group of antibiotics.

CHEMICAL AND PHYSICAL PROPERTIES OF COPPER-FREE ZORBONOMYCIN HYDROCHLORIDE

Elemental Analysis: Found: C, 43.22; H, 6.55; N, 16.11; O, 24.45; S, 4.13; Cl, 4.14; Cu, 0.00619.

Optical rotation: $[\alpha]_D^{25}=+19°$ (c., 0.99, water).

Molecular weight: 543 (determined by vapor pressure measurements in methanol solution).

Equivalent weight: 628 (titrated in glacial acetic acid with perchloric acid).

Solubilities: Copper-free zorbonomycin hydrochloride has the same solubility properties as disclosed above for copper-containing zorbonomycin hydrochloride.

U.V. spectrum: Copper-free zorbonomycin hydrochloride has a characteristic U.V. absorption spectrum as determined in absolute methanol.

| λ Max. (mμ): | a |
|---|---|
| 234 | 16.97 |
| 298 | 3.20 |

Infrared spectrum: The infrared absorption spectrum of copper-free zorbonomycin hydrochloride salt suspended in mineral oil mull is reproduced in FIG. 6 of the drawing. Copper-free zorbonomycin hydrochloric salt gives bands at the following wave lengths expressed in reciprocal centimeters:

| | | |
|---|---|---|
| 330 (S) | 1545 (S) | 1105 (S) |
| 3200 (S) (sh) | 1515 (S) (broad) | 1055 (S) |
| 2920 (S) (oil) | 1455 (S) (oil) | 1020 (S) |
| 2850 (S) (oil) | 1375 (S) (oil) | 988 (M) |
| 1690 (S) (sh) | 1260 (M) | 807 (M) |
| 1655 (S) | 1210 (M) (broad) | 720 (S) |
| 1550 (S) (sh) | 1130 (M) (broad) | |

Figure 7:
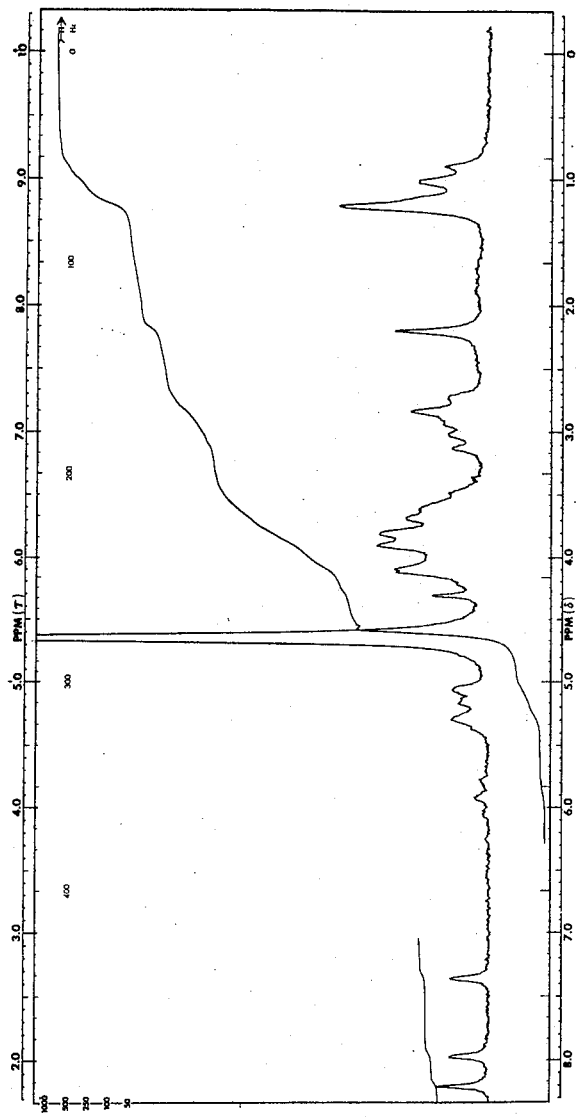
FIG. 7, NMR spectrum of copper-free zorbonomycin hydrochloride.

Nuclear magnetic resonance (NMR): Copper-free zorbonomycin hydrochloride has a characteristic NMR spectrum as shown in FIG. 7 of the accompanying drawing. The NMR spectrum was observed on a Varian A–60 spectrometer on a solution (ca. 0.5 ml., ca. 15% concentration) of the sample of copper-free zorbonomycin hydrochloride in deuterium oxide ($D_2O$). The spectrum was calibrated against internal tetramethylsilane and the precision of the Δγ was >± 1 c.p.s. Frequencies were recorded in c.p.s. downfield from tetramethylsilane.

CHEMICAL AND PHYSICAL PROPERTIES OF ZORBONOMYCIN B HYDROCHLORIDE

Elemental analysis: Found: C, 42.26; H, 5.43; N, 1606; Cl, 4.32; S, 3.75; Cu, 3.81; O, 24.37 (by diff.); Ash, 5.01; $H_2O$, 5.88.

Molecular formula:

$$C_{58}H_{90}N_{19}O_{25}Cl_2S_2Cu$$

Potentiometric titration: Equivalent weight=860 (determined in glacial acetic acid using perchloric acid as titrant.)

U.V. spectrum.—In absolute methanol:

| λ Max. | a |
|---|---|
| 243 | 15.29 |
| 293 | 12.63 |
| 308 (sl. sh.) | 9.59 |
| 327 | 2.95 |
| 600 | 0.08 |

Infrared spectrum: The infrared absorption spectrum of zorbonomycin B hydrochloride suspended in a mineral oil mull is reproduced in FIG. 8 of the drawing. Zorbonomycin B hydrochloride, when suspended in a mineral oil mull, gives bands of the following wave lengths expressed in reciprocal centimeters:

| | | |
|---|---|---|
| 3300 (S) | 1505 (S) | 1100 (M) |
| 2940 (S) (Nujol) | 1455 (S) | 1055 (S) |
| 2910 (S) (Nujol) | 1370 (S) | 1010 (S) |
| 2845 (S) | 1360 (S) | 988 (S) |
| 2720 (M) (sh) | 1335 (S) | 925 (M) |
| 2670 (M) (sh) | 1294 (S) | 885 (W) |
| 1715 (S) | 1245 (M) | 860 (W) |
| 1662 (S) | 1195 (M) | 823 (M) |
| 1635 (S) | 1145 (M) | 762 (M) |
| 1545 (S) | 1137 (M) | 717 (M) |
| 1515 (S) | | |

Zorbonomycin B hydrochloride, when pressed into a KBr pellet, gives bands at the following wave lengths expressed in reciprocal centimeters:

| | | |
|---|---|---|
| 3360 (S) | 1520 (S) | 1100 (S) |
| 3200 (S) (sh) | 1455 (S) | 1057 (S) |
| 3125 (S) (sh) | 1370 (S) | 1016 (S) |
| 2970 (M) | 1335 (M) | 990 (S) |
| 2930 (M) | 1290 (M) | 935 (W) |
| | 1245 (M) | 865 (W) |
| 1717 (S) | 1195 (M) | 810 (W) |
| 1655 (S) | 1148 (M) | 765 (M) |
| 1587 (S) | 1134 (M) | 720 (M) |
| 1547 (S) | | |

Thin-layer chromatography: Zorbonomycin B hydrochloride is compared with the phleomycin complex in FIG. 9 of the accompany drawing. The thin-layer chromatography was conducted on MN-Polygram Cellulose 300 (Sold by Brinkmann Instruments, Inc.) using 0.2 M aqueous $NH_4Cl$ as the developing solvent. This thin-layer chromatogram clearly shows that zorbonomycin B hydrochloride is not a member of the phleomycin complex.

CHEMICAL AND PHYSICAL PROPERTIES OF COPPER - FREE ZORBONOMYCIN B HYDROCHLORIDE

Elemental analysis: Found: C, 43.73; H, 5.71; N, 16.20; Cl, 4.74; S, 4.26, Cu, 0.12.

Potentiometric titration: Equivalent weight=818 (Determined in glacial acetic acid using perchloric acid as the titrant.)

U.V. spectrum.—In absolute methanol:

| γ Max. | a |
|---|---|
| 235 (sl. sh) | 6.40 |
| 293 | 4.28 |
| 306 (sl. sh) | 3.22 |

Molecular formula:

$$C_{58}H_{90-94}N_{19}O_{25}Cl_2S_2$$

Infrared spectrum: The infrared absorption spectrum of copper-free zorbonomycin B hydrochloride suspended in mineral oil mull is reproduced in FIG. 10 of the drawing. Copper-free zorbonomycin B hydrochloride, when suspended in a mineral oil mull, gives bands at the following wave lengths expressed in reciprocal centimeters:

| | | |
|---|---|---|
| 3400 (S) (sh) | 1515 (S) (broad) | 1055 (S) |
| 3330 (S) | 1465 (S) (sh) | 1025 (S) (sh) |
| 3220 (S) (sh) | 1455 (S) (oil) | 989 (M) |
| 2920 (S) (oil) | 1445 (S) (sh) | 970 (M) |
| 2850 (S) | 1375 (S) (oil) | 887 (W) |
| 1715 (M) (sh) | 1365 (S) (sh) | 857 (W) |
| 1685 (S) (sh) | 1255 (M) | 822 (M) |
| 1650 (S) | 1130 (M) | 760 (M) |
| 1625 (S) (sh) | 1104 (S) | 720 (M) (oil) |
| 1545 (S) | | |

Copper-free zorbonomycin B hydrochloride, when pressed into a KBr pellet, gives bands at the following wave lengths expressed in reciprocal centimeters:

| | | |
|---|---|---|
| 3360 (S) | 1540 (S) | 1100 (M) |
| 3200 (S) | 1510 (S) | 1050 (S) |
| 2970 (M) | 1250 (M) | 1020 (M) |
| 2930 (M) | 1130 (M) | 985 (M) |
| 1650 (S) | | |

Figure 11:
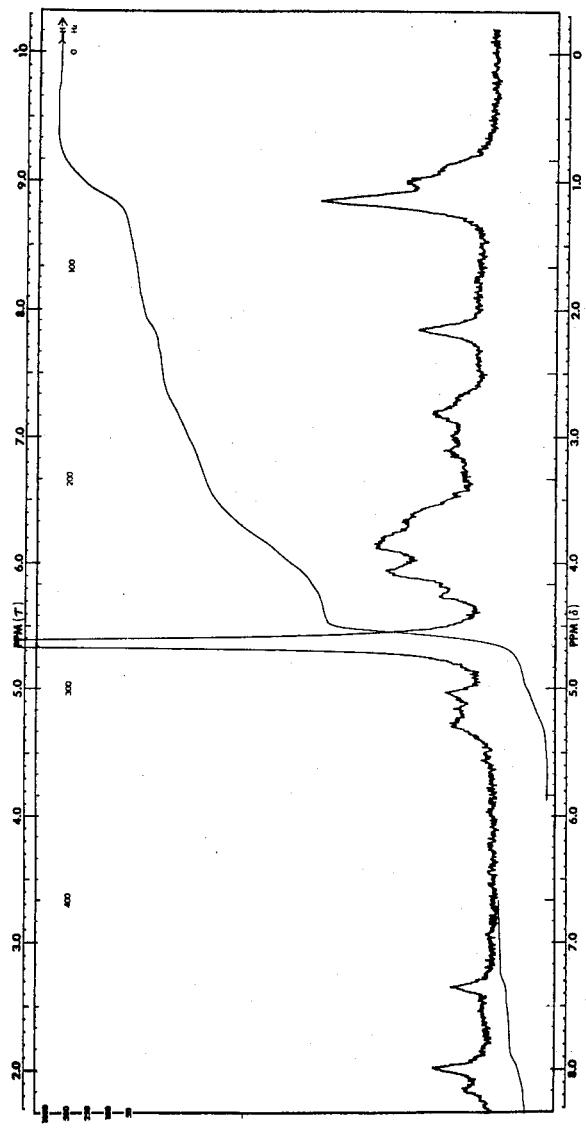
FIG. 11, NMR spectrum of copper-free zorbonomycin B hydrochloride.

Nuclear magnetic resonance (NMR): Copper-free zorbonomycin B hydrochloride has a characteristic NMR spectrum as shown in FIG. 11 of the accompanying drawing. The NMR spectrum was observed on a Varian A–60 spectrometer on a solution (ca. 0.5 ml., ca. 15% concentration) of the sample of copper-free zorbonomycin B hydrochloride in deuterium oxide ($D_2O$). The spectrum was calibrated against internal tetramethylsilane and the precision of the $\Delta\gamma$ was $>\pm 1$ c.p.s. Frequencies were recorded in c.p.s. downfield from tetramethylsilane.

ANTIBACTERIAL PROPERTIES OF ZORBONOMYCIN B

Test procedure:
Medium: Streptomycin assay broth (Baltimore Biological Laboratory, Baltimore, Md.).
Preparation of antibiotic: The antibiotic preparations are weighed as dry powders, dissolved in distilled water, and then are sterile-filtered in 0.45 m$\mu$ disposable filters (Nalge Co., Rochester, N.Y.). Equal volumes of dissolved antibiotic and double concentration medium are mixed to give the highest starting level.
Assay method: A final dilution of 1/40,000 of a fully grown cutlure is made in the assay medium. Incubation is unshaken at 37° C. End points are read at 18.

| | MIC* in mcg./ml. | |
|---|---|---|
| Test organisms | Zorbonomycin | Zorbonomycin B |
| Escherichia coli | 0.1 | 0.2 |
| Klebsiella pneumoniae | 0.025 | 0.025 |
| Pseudomonas aeruginosa | 200.0 | >200.0 |
| Proteus vulgaris | 6.25 | 3.12 |
| Proteus pmirabilis | 12.5 | 6.25 |
| Sttahylococcus aureus | 0.2 | 0.2 |
| Streptococcus hemolyticus | 25.0 | >200.0 |
| Streptococcus faecalis | >200.0 | >200.0 |
| Salmonella typhosa | 0.05 | 0.05 |
| Salmonella paratyphi B | 0.2 | 0.2 |
| Salmonella gallinarum | 0.05 | 0.1 |
| Aerobacter aerogenes | 0.39 | 0.39 |
| Sarcina lutea | 25.0 | 25.0 |
| Shigella sonnei | 0.39 | 0.2 |

*Minimum inhibitory concentration.

ANTIBACTERIAL PROPERTIES OF COPPER-FREE ZORBONOMYCIN AND COPPER-FREE ZORBONOMYCIN B

Copper-free zorbonomycin

The antibacterial spectrum was determined in an *in vitro* disc plate assay. The assay procedure is as follows:

A solution of copper-free zorbonomycin was prepared at 800 $\mu$g./ml. in distilled water. Paper assay discs (½ inch-Schleicher and Schuell, Keene, N.H.) were dipped into the solution and spotted on seeded agar trays. The zones were read after 18 hours incubation.

| Test organism | Assay medium* | Zone of inhibition (mm.) copper-free zorbonomycin |
|---|---|---|
| B. subtilis | A | 40 |
| S. gallinarum | B | 30 |
| B. cereus | C | 23 |
| S. schottmuelleri | B | 27.5 |
| P. vulgaris | B | 21 |
| E. coli | B | 30.5 |
| S. aureus | B | 28 |
| S. lutea | C | 17 |
| M. avium | D | 41 |
| K. pneumoniae | A | 32.5 |

*A=Streptomycin assay agar (BBL); B=Nutrient agar (BBL); C=Pen-assay seed agar (BBL); D=Brain heart infusion agar (Difco).

Copper-free zorbonomycin B

The antibacterial spectrum was determined in an *in vitro* test as disclosed previously for the testing of zorbonomycin and zorbonomycin B.

| Test organism: | MIC (mcg./ml.) |
|---|---|
| E. coli | 0.1 |
| K. pneumoniae | 0.0125 |
| Ps. aeruginosa | >200.0 |
| P. vulgaris | 1.56 |
| P. mirabilis | 12.5 |
| S. aureus | 0.2 |
| Str. hemolyticus | >200.0 |
| Str. faecalis | >200.0 |
| S. lutea | 6.25 |
| S. typhosa | 0.025 |
| S. paratyphi B | 0.2 |
| S. gallinarum | 0.025 |
| A. areogenes | 0.39 |
| S. sonnei | 0.10 |

Antifungal spectrum of zorbonomycin

Test procedure: An agar dilution method is used. All samples to be assayed are received in 100 mg. amounts. The material is solubilized in 1 ml. of dimethylformamide (DMF) and diluted to 10 ml. with Fungal Spectrum Broth unless complete solubility in water is noted on the screening form. The material to be tested is incorporated in melted (48° C.) Fungal Spectrum (F.S.) Agar at concentrations of 250, 25, 2.5 and 0.25 mcg./ml. Fifteen ml. of agar is pipetted into a petri dish. After solidification, the surface is streaked with agar spore suspensions of human fungal pathogens. The suspensions are made by adding 10 ml. sterile distilled water to agar slants of the test organism. The slant surface is scraped with a sterile inoculating needle, and 0.5 ml. of this suspension is added to 9.5 ml. melted (48° C.) F.S. agar in an assay receptacle.

The streaked plates are incubated at 28° C. for 72 hours at which time results are recorded. Readings are by visual observation.

Fungal Spectrum Agar (gram per liter of distilled water: dextrose 10, peptone 5, yeast extract 1, agar 20, pH 6.8). Fungal Spectrum Broth has the same composition but without the agar.

| | Concentration (mcg./ml.) | | | |
|---|---|---|---|---|
| Test organisms | 250 | 25 | 2.5 | 0.25 |
| Blastomyces dermatitidis | − | − | + | + |
| Coccidioides immitis | − | − | + | + |
| Geotrichum Sp | − | − | + | + |
| Cryptococcus neoformans | − | − | − | + |
| Histoplasma capsulatum | − | − | − | + |
| Sporotrichum schenckii | − | − | − | + |
| Monosporium apiospermum | − | − | − | + |
| Trichophyton rubrum | − | − | − | + |
| Trichophyton violaceum | − | − | − | + |
| Trichophyton asteroides | − | ± | + | + |
| Trichophyton mentagrophytes | − | − | + | + |

NOTE.—±=Partial inhibition; +=No inhibition; −=Inhibition.

THE MICROORGANISM

The actinomycete used according to this invention for the production of zorbonomycin and zorbonomycin B is *Streptomyces bikiniensis* var. *zorbonensis* sp. nova. One of its strain characteristics is the production of zorbonomycin and zorbonomycin B. A subculture of the living organism was deposited without restriction and can be obtained from the permanent collection of the Northern Utilization and Research Division, Agricultural Research Service, U.S. Department of Agriculture, Peoria, Ill., U.S.A. Its accession number in this repository is NRRL 3684.

The microorganism of this invention was studied and characterized by Alma Dietz of the Upjohn Research Laboratory.

DESCRIPTION OF THE MICROORGANISM

*Streptomyces bikiniensis* var. *zorbonensis* is a new soil isolate of the genus Streptomyces. The new isolate has been found to differ from the type culture *Streptomyces bikiniensis* [Soil Science, 64: 453–458 (1947); Soc. for Experimental Biol. and Medicine, 65: 294–295 (1947); J. Bacteriol. 55: 317–326 (1948)] in its antibiotic producing properties and in some cultural characteristics as noted in the following Tables. The new soil isolate, which has been compared with the type culture *Streptomyces bikiniensis* and found to differ in some characteristics, is designated *Streptomyces bikiniensis* var. *zorbonensis* var. nova.

*Streptomyces bikiniensis* var. *zorbonensis* is compared with the type species *Streptomyces bikiniensis* [Johnstone and Waksman, supra] ATCC 11062.

Color characteristics.—Aerial growth gray to grayish yellow. Melanin positive Appearance on Ektachrome is given in Table 1. Reference color characteristics are given in Table 2. The cultures may be placed in the Gray (GY) series of Tresner and Backus [Applied Microbiol. 11: 335–338 (1962)].

Microscopic characteristics.—Sporophores long, straight (RF) in the sense of Pridham et al. [Applied Microbiol. 6: 52–79 (1958)]. Spores large, more than 50 per chain. Spores smooth, irregular in size by direct electron microscope examination. Spore surface ridged with much surface detail by the carbon replication method of Dietz and Mathews [Applied Microbiol. 10: 258–263 (1962); 16: 935–941 (1968)].

Cultural characteristics.—See Table 3.

Carbon utilization.—In the synthetic medium of Pridham and Gottlieb [J. Bacteriol, 56: 107–114 (1948)] both cultures had slight growth on the control (synthetic medium with no carbon compound added); good growth on D-xylose, L-arabinose, D-galactose, D-glucose, D-mannose, maltose, cellobiose, dextrin, soluble starch, glycerol, salicin, sodium acetate, sodium citrate, and sodium succinate; moderate growth on dulcitol, D-mannitol, D-sorbitol, and inositol; slight growth on inulin, phenol, sodium formate, sodium tartrate; no growth on cresol, sodium oxalate, or sodium salicylate. *S. bikiniensis* var. *zorbonensis* had good growth on rhamnose, D-fructose, and lactose; moderate growth on sucrose and raffinose. *S. bikiniensis* had moderate growth on rhamnose, D-fructose, and lactose; poor growth on sucrose and raffinose. In the synthetic medium of Shirling and Gottlieb [International Journal of Systemic Bacteriology 16: 313–340 (1966)] both culture had slight growth on the negative control (basal medium without a carbon compound); good growth on the positive control (basal medium with glucose); good growth on D-xylose; moderate growth on L-arabinose and D-fructose; poor growth on sucrose; no growth on inositol, raffinose, or cellulose. *S. bikiniensis* var. *zorbonensis* had good growth on rhamnose and no growth on D-mannitol; *S. bikiniensis* had moderate growth on both.

Temperature.—*S. bikiniensis* var. *zorbonensis* grew well at 18–37° C. on Bennett's, Czapek's sucrose, and maltose-tryptone agars; *S. bikiniensis* grew well at 24–28° C. on Bennett's and maltose-tryptone agars; well at 18–28° C. on Czapek's sucrose agar. Both cultures had trace vegetative growth in 24 hours at 45° C. *S. bikiniensis* had trace vegetative growth in 24 hours at 55° C.

The characteristics of *Streptomyces bikiniensis* var. *zorbonensis* var. nova, NRRL 3684, are given in the following tables:

Table 1: Appearance of *S. bikiniensis* Cultures on Ektachrome

Table 2: Reference Color Characteristics of *S. bikiniensis* Cultures

Table 3: Cultural Characteristics of *S. bikiniensis* Cultures

TABLE 1

[Appearance of *S. bikiniensis* cultures on Ektachrome *]

| Agar medium | *S. bikiniensis* v. *zorbonensis* | *S. bikiniensis* ATCC 11062 |
| --- | --- | --- |
| Bennett's: | | |
| S | Gray | Gray |
| R | Tan brown | Tan brown |
| Czapek's sucrose: | | |
| S | Gray | Gray |
| R | Colorless | Colorless |
| Maltose-tryptone: | | |
| S | Gray | Gray |
| R | Brown | Brown |
| Peptone-iron: | | |
| S | Gray | Gray |
| R | Brown | Brown |
| 0.1% tyrosine: | | |
| S | Gray | Gray |
| R | Tan | Tan |
| Casein starch: | | |
| S | Gray | Gray |
| R | Tan | Tan |

*Dietz, A., "Ektachrome Transparencies as Aids in Actinomycete Classification," Annals of the New York Academy of Sciences, 60; 152–154, 1954.

NOTE.—S=Surface; R=Reverse.

TABLE 2

[Reference color characteristics of *S. bikiniensis* cultures]

| | Color Harmony Manual, 3d ed., 1948 (5) | | NBS Circular 553, 1955 (9) | |
| --- | --- | --- | --- | --- |
| Agar medium | *S. bikiniensis* var. *zorbonensis* | *S. bikiniensis* ATCC 11062 | *S. bikiniensis* var. *zorbonensis* | *S. bikiniensis* ATCC 11062 |
| Bennett's: | | | | |
| S | 2fe covert gray | 2fe covert gray | 94g light olive brown, 112gm light olive gray | 94g light olive brown, 112gm light olive gray |
| R | 2ge covert tan, griege | 2gc bamboo, chamois | 94m light olive brown, 109gm light grayish olive | 90gm grayish yellow |
| P | 1½ec putty | 2ge covert tan, griege | 90gm grayish yellow, 93m yellowish gray | 94m light olive brown, 109gm light grayish olive |
| Czapek's sucrose: | | | | |
| S | 2fe covert gray | 3dc natural | 94g light olive brown, 112gm light olive gray | |
| R | 2ge covert tan, griege | 3dc natural | 94m light olive brown, 109gm grayish olive | |
| P | | | | |
| Maltose-tryptone: | | | | |
| S | 2fe covert gray | 2fe covert gray | 94g light olive brown, 112gm light olive gray | 94g light olive brown, 112gm light olive gray |
| R | 3lg adobe brown, cinnamon brown, light brown | 2ie light mustard to 3lg adobe brown, cinnamon brown, light brown | 77gm moderate yellowish brown | 91gm dark grayish yellow, 94g light olive brown, 106g light olive to 77gm moderate yellowish brown |
| P | 3ig beige brown | 3ge beige, camel | 80m grayish yellowish brown, 95g moderate olive brown | 76gm light yellowish brown |
| Yeast extract-malt extract (ISP-2): | | | | |
| S | 3fe silver gray | 3fe silver gray | 63gm light brownish gray | 63gm light brownish gray |
| R | 3ie camel, maple sugar, tan | 3ie camel, maple sugar, tan | 76m light yellowish brown, 77g moderate yellowish brown | 76m light yellowish brown, 77g moderate yellowish brown |
| P | 3ge beige, camel | 3ig beige brown, mist brown | 76gm light yellowish brown | 80m grayish yellowish brown, 95g moderate olive brown |

TABLE 2—Continued

| Agar medium | Color Harmony Manual, 3d ed., 1948 (5) | | NBS Circular 553, 1955 (9) | |
|---|---|---|---|---|
| | S. bikiniensis var. zorbonensis | S. bikiniensis ATCC 11062 | S. bikiniensis var. zorbonensis | S. bikiniensis ATCC 11062 |
| Oatmeal (ISP-3): | | | | |
| S | 3fe silver gray | 3fe silver gray | 63gm light brownish gray | 63gm light brownish gray. |
| R | 2ec biscuit, ecru, oatmeal, sand. | 2gc bamboo, chamois | 90gm grayish yellow | 90gm grayish yellow. |
| P | | 3ec bisque, light beige | | 79gm light grayish yellowish brown, 90g grayish yellow. |
| Inorganic-salts starch (ISP-4): | | | | |
| S | 2fe covert gray | 2fe covert gray | 94g light olive brown, 112gm light olive gray. | 94g light olive brown, 112gm light olive gray. |
| R | 1½ge light olive gray | 2gc bamboo, chamois | 109gm light grayish olive | 90gm grayish yellow. |
| P | | | | |
| Glycerol asparagine: | | | | |
| S | 3fe silver gray | 3dc natural | 63gm light brownish gray | |
| R | 2ie light mustard tan | 2ig slate tan | 91gm dark grayish yellow, 94g light olive brown, 106g light olive. | 110g grayish olive, 112m light olive gray. |
| P | 2ec biscuit, ecru oatmeal, sand. | 2ec biscuit, ecru, oatmeal, sand. | 90gm grayish yellow | 90gm grayish yellow. |

NOTE.—S=Surface; R=Reverse; P=Pigment. All data using matte surface of chips.

TABLE 3

Cultural characteristics of S. bikiniensis

| | S. bikiniensis v. zorbonensis | S. bikiniensis ATCC 11062 |
|---|---|---|
| Agar media: | | |
| Peptone-iron: | | |
| S | Gray | Gray. |
| R | Brown | Brown. |
| P | Melanin-positive | Melanin-positive. |
| Calcium malate: | | |
| S | Gray | Gray-tan. |
| R | Gray | Tan. |
| P | None | None. |
| O | Malate not solubilized | Malate not solubilized. |
| Glucose-asparagine: | | |
| S | Gray | Gray. |
| R | Yellow-tan | Yellow-tan. |
| P | Yellow | Yellow. |
| Skim milk: | | |
| S | Trace gray-pink | Gray-pink. |
| R | Tan-brown | Tan-brown. |
| P | Red-tan | Red-tan. |
| O | Casein solubilized | Casein solubilized. |
| Tyrosine: | | |
| S | Gray | Gray. |
| R | Brown in center; yellow-tan on periphery. | Brown in center; yellow-tan on periphery. |
| P | Yellow pigment | Yellow-tan pigment. |
| O | Tyrosine solubilized | Tyrosine solubilized. |
| Xanthine: | | |
| S | Gray | Gray. |
| R | Cream with brown | Cream with brown. |
| P | Yellow | Yellow. |
| O | Xanthine solubilized | Xanthine solubilized. |
| Yeast extract-malt extract: | | |
| S | Gray | Gray. |
| R | Tan | Tan-brown. |
| P | Pale yellow | Yellow-tan. |
| Nutrient starch: | | |
| S | Gray | Gray. |
| R | Cream with brown | Cream with brown. |
| P | Pale yellow | Pale yellow. |
| O | Starch hydrolyzed | Starch hydrolyzed. |
| Bennett's: | | |
| S | Gray | Gray. |
| R | Cream-brown | Yellow-tan. |
| P | | Pale yellow. |
| Czapek's sucrose: | | |
| S | Gray | Gray. |
| R | Gray | Gray. |
| P | | |
| Maltose-tryptone: | | |
| S | Gray | Gray. |
| R | Cream-brown | Yellow-tan. |
| P | Pale yellow-tan | Pale tan. |
| Peptone-yeast extract-iron (ISP-6): | | |
| S | Blue-gray | Blue-gray. |
| R | Brown | Brown. |
| P | Tan-brown | Tan-brown. |
| Tyrosine (ISP-7): | | |
| S | Gray | Gray. |
| R | Yellow-gray | Yellow-tan. |
| P | Trace yellow | Trace yellow-pink-tan. |
| Gelatin media: | | |
| Plain: | | |
| P | Tan-1/4 | Olive. |
| O | Liquefaction complete | Liquefaction complete. |
| Nutrient: | | |
| P | Tan | Tan. |
| O | Liquifaction complete | Liquefaction complete. |

TABLE 3—Continued

| | S. bikiniensis v. zorbonensis | S. bikiniensis ATCC 11062 |
|---|---|---|
| Broth media: | | |
| Synthetic nitrate: | | |
| S | Trace gray-white aerial on surface pellicle. | Trace white aerial on surface pellicle. |
| P | Pale yellow | Pale yellow. |
| O | Flocculent bottom growth; Nitrate not reduced to nitrite 50%, nitrate reduced 50%. | Flocculent bottom growth; Nitrate not reduced to nitrite 50%, nitrate reduced 50%. |
| Litmus milk: | | |
| S | Trace gray aerial on brown surface ring. | Gray aerial on brown surface ring. |
| O | Peptonization variable; Reduction variable; pH 7.8. | Peptonization variable; Reduction variable; pH 7.8. |

NOTE.—S=Surface; R=Reverse; P=Pigment; O=Other characteristics.

The new compound of the invention is produced when the elaborating organism is grown in an aqueous nutrient medium under submerged aerobic conditions. It is to be understood also that for the preparation of limited amounts, surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solubles, animal peptone liquors, meat and bone scraps, and the like. Combinations of these carbon and nitrogen sources can be used advantageously. Trace metals, for example, zinc, magnesium, manganese, cobalt, iron and the like need not be added to the fermentation medium since tap water and unpurified ingredients are used as medium components.

Production of the compound of the invention can be effected at any temperature conducive to satisfactory growth of the microorganism, for example, between about 18° and 40° C., and preferably between about 20° and 32° C. Ordinarily, optimum production of the compound is obtained in about 2 to 10 days. The medium normally remains weakly acidic (pH 5.5–7.0) during the fermentation. The final pH is dependent, in part on the buffers present, if any, and in part on the initial pH of the culture medium which is advantageously adjusted to about pH 7.0 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention, zorbonomycin, is considered to be an amphoteric compound. The presence of basic groups in the zorbonomycin molecule is evidenced by the adsorption of the antibiotic on cationic exchange resin. When the pH of an aqueous solution of zorbonomycin is adjusted to about 3.5, the antibiotic precipitates out of the solution. To explain this behaviour of zorbonomycin, it is assumed that acidic group(s) are present in the molecule and that at about a pH of about 3.5 the antibiotic is present in an "internal ion" form which has limited solubility in water. Zorbonomycin as the hydrochloride salt is highly soluble in water and methanol. It has limited solubilities in absolute ethanol and other lower alcohols. It is relatively insoluble in acetone, ethyl acetate, chlorinated hydrocarbons, and saturated hydrocarbon solvents.

Zorbonomycin B has the same solubility properties as zorbonomycin.

A variety of procedures can be employed in the isolation and purification of zorbonomycin and zorbonomycin B, for example, absorption procedures followed by elution with a suitable solvent, and column chromatography.

In a preferred recovery process, zorbonomycin and zorbonomycin B are recovered from their culture medium by separation of the mycelia and undissolved solids by conventional means, such as by filtration or by centrifugation. The antibiotics are then removed from the filtered or centrifuged broth by passage over a resin, advantageously, a non-ionic macro-porous copolymer of styrene cross-linked with divinylbenzene. (The resin is prepared by suspension polymerization of styrene divinylbenzene copolymers in the presence of a substance which is a good solvent for the copolymer. See J.A.C.S. 74, 306, 1962. Suitable resins are known by the trade names Amberlite XAD-1 and Amberlite XAD-2; Rohm & Haas Co.) After washing the resin column with water, the column is eluted with a suitable solvent, for example, aqueous acetone in varying percentages. The acetone eluates are combined and concentrated by freeze drying to give a crude preparation of zorbonomycin and zorbonomycin B. This preparation can be used in environments where separation of zorbonomycin from zorbonomycin B is not necessary and purified antibiotic is not considered essential.

Further purification of the mixture of zorbonomycin and zorbonomycin B, described above, can be achieved by a precipitation process. In such a process, the crude preparation of zorbonomycin and zorbonomycin B, disclosed above, is suspended, advantageously, in absolute methanol. The mixture is then filtered and the filtrate concentrated. The pH is adjusted to about 6.2 with a mineral acid, for example, aqueous hydrochloric acid, and the mixture again concentrated. The concentrate is then mixed with acetone. The precipitate which forms is removed by centrifugation. The remaining filtrate is mixed with a solvent in which zorobonomycin and zorobonomycin B are not soluble, for example, acetone, and the precipitated material which forms again is removed by filtration, washed with acetone and Skellysolve B (isomeric hexanes), and dried in vacuo to give a relatively pure preparation of zorbonomycin and zorbonomycin B. This preparation can be purified further by passing the preparation, after dissolving the same in water and methanol, over a cationic exchange resin, for example, IRC-50, advantageously in the ammonium ion form. The column is then eluted with a solvent for zorbonomycin and zorbonomycin B, for example, aqueous ammonium chloride. The ammonium chloride in the eluates can be removed by the use of a non-ionic macro-porous resin, as described previously. For example, the ammonium chloride eluates can be mixed with cupric chloride and this mixture then passed over Amberlite XAD-2 resin. The column can be eluted with water and the aqueous freeze dried to give a preparation rich in zorbonomycin containing small amounts of zorbonomycin B. This preparation can be used in environments where the highly purified antibiotic is not considered essential.

Preparations containing zorbonomycin and zorbonomycin B can be subjected to further column chromatography to separate the antibiotics. For example, upon passing a solution of a preparation containing zorbonomycin and zorbonomycin B through a column containing CM-Sephadex-C-25 (Pharmacia Fine Chemicals, Inc.) and eluting the column with aqueous ammonium chloride, there are obtained eluates containing only zorbonomycin, and eluates containing only zorbonomycin B. The pure antibiotics can be isolated from the eluates by first removing the ammonium chloride, as described previously, then concentrating and freeze drying the eluates.

Other adsorbents which can be used to separate zorbonomycin from zorbonomycin B, as described above are cation exchangers, for example, sulfonic acid Sephadex® (Pharmacia, Uppsala, Sweden) and the like adsorbents, for example, cellulose and the like, or mixtures thereof.

Column fractions containing the separated antibiotics, as described above, as well as final preparations of the antibiotics, are analyzed by thin-layer chromatography to ascertain purity. The thin-layer chromatography is conducted using a system MN-Polygram CEL-300 (20 x 20 cm, (Brinkmann Instruments, Inc.) 0.1 M $NH_4Cl$ in $H_2O$, pH 7.5 ($NH_4OH$), and bioautographed on a B. subtilis seeded agar tray. Zorbonomycin has an $R_f$ of .4–.5 on this system, whereas zorbonomycin B has an $R_f$ of .2–.3.

Zorbonomycin and zorbonomycin B also can be recovered from fermentation beers containing the same by use of carbon adsorption techniques. For example, the filtrate from a fermentation beer can be passed through a column containing activated carbon. The column can be eluted with acetone and the acetone eluates can then be adsorbed on a cation exchange resin, as described above in the preferred recovery process. The remaining process steps would then be the same as the preferred process to recover pure zorbonomycin and zorbonomycin B.

Another process which can be used to recover zorbonomycin and zorbonomycin B from a fermentation beer containing the same is to first defat the filtered fermentation beer with a defatting agent, for example, Skellysolve B (isomeric hexanes), then extract the defatted beer with a liquid ion exchanger. Suitable exchangers are sodium dinonylnaphthalene sulfonate to transfer the antibiotic activities from the defatted beer to an organic solvent, and t-octylamine to transfer and concentrate the antibiotics from the organic solvent to water. Following this operation there are obtained preparations rich in zorbonomycin and zorbonomycin B. The separation of these entities can be accomplished by the chromatography procedure over CM-Sephadex (C-25) as described above in the preferred recovery process.

Since zorbonomycin and zorbonomycin B are amphoteric substances, they form salts with acids, alkali metals, alkaline earth metals, and amines. Metal salts can be prepared by dissolving zorbonomycin or zorbonomycin B in water, adding a dilute metal base until the pH of the solution is about 7 to 8, and freeze-drying the solution to provide a dried residue consisting of zorbonomycin metal salt. Zorbonomycin and zorbonomycin B metal salts include the sodium, potassium, and calcium salts. Amine salts, including those with organic bases such as primary, secondary, and tertiary mono-, di-, and polyamines also can be formed using the above-described or other commonly employed procedures. Other salts are obtained with therapeutically effective bases which impart additional therapeutic effects thereto. Such bases are, for example, the purine bases such as theophyllin, theobromin, caffein, or derivatives of such purine bases; antihistaminic bases which are capable of forming salts with weak acids; pyridine compounds such as nicotinic acid amide, isonicotinic acid hydrazide, and the like; phenylalkylamines such as adrenalin, ephedrin, and the like; choline, and others.

Acid salts can be made by neutralizing zorbonomycin or zorbonomycin B with the appropriate acid to below about pH 7.0, and advantageously to about pH 2 to pH 6. Suitable acids for this purpose include hydrochloric, sulfuric, phosphoric, and the like. Salts of copper-free zorbonomycin and copper-free zorbonomycin B also can be made by the above-described procedures. Acid and base salts of zorbonomycin, zorbonomycin B, copper-free zorbonomycin and copper-free zorbonomycin B can be used for the same biological purposes as the parent compounds.

Zorbonomycin, zorbonomycin B and their copper-free forms are active against *Escherichia coli* and can be used to reduce, arrest, and eradicate slime production in paper-mill systems caused by their antibacterial action against this microorganism. They can also be used to prolong the life of cultures of *Trichomonas foetus, Trichomonas hominis,* and *Trichomonas vaginalis* by freeing them of *Escherichia coli* contamination. Zorbonomycin can be used as the antifungal agent in the shoe upper disclosed in U.S. Pat. 3,130,505. Also, since zorbonomycin is active against *Cryptococcus neoformans,* it can be used to treat pigeon roosts to inhibit this fungus which has been found in pigeon droppings (Journal of the American Medical Association, Volume 191, No. 4, Jan. 25, 1965, pages 269–274). Further, the novel compounds of the invention can be used to swab laboratory benches and equipment in a microbiological laboratory.

When the previously described liquid ion exchange process is used to recover zorbonomycin and zorbonomycin B, there is also recovered a basic polysaccharide-like material which by acid hydrolysis yields D-fucosamine (2-amino-6-deoxygalactose). D-fucosamine can be isolated as the crystalline hydrochloride. D-fucosamine is a well known compound which can be used (1) in studies involving genetics of microorganisms where D-fucosamine is a genetic marker, (2) in the organic synthesis of new antibiotics where the aminosugar moiety of known antibiotics is replaced with D-fucosamine, and (3) for the preparation of a compound of the formula

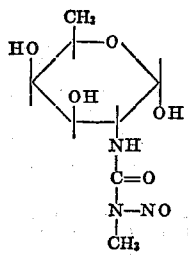

by reacting first with methyl isocyanate and then nitrosating to prepare the analog of streptozotocin which has antibacterial properties.

The following examples are illustrative of the process and products of the present invention but are not to be construed as limiting. All percentages are by weight and all solvent mixture proportions are by volume unless otherwise noted.

EXAMPLE 1

Part A: Fermentation

A soil stock of *Streptomyces bikiniensis* var. *zorbonensis* NRRL 3684, is used to inoculate 500-ml. Erlenmeyer seed flasks containing 100 ml. of sterile medium consisting of the following ingredients:

|  | G. |
|---|---|
| Glucose monohydrate | 25 |
| Pharmamedia* | 25 |
| Tap water q.s. 1 liter. | |

*Pharmamedia is an industrial grade of cottonseed flour produced by Traders Oil Mill Company, Fort Worth, Tex.

The seed medium pre-sterilization pH is 7.2. The seed inoculum is grown for 3 days at 28° C. on a Gump rotary shaker operating at 250 r.p.m.

Seed inoculum, as prepared above, is used to inoculate 500 ml. Erlenmeyer fermentation flasks containing 100 ml. of sterile fermentation medium consisting of the following ingredients:

| Glucose monohydrate | g./liter | 10 |
| Cornstarch | g./liter | 20 |
| Calcium carbonate | g./liter | 5 |
| Ammonium sulfate | g./liter | 3 |
| Distillers' solubles | g./liter | 15 |
| Corn oil | ml. | 2 |
| Ucon LB 625 (a polyalkylene glycol synthetic defoaming fluid supplied by Union Carbide Chem. Co.) | ml. | 2 |
| Tap water q.s. to 1 liter. | | |

The pre-sterilization pH is adjusted to 7.2 with aqueous NaOH. The fermentation flasks are inoculated at the rate of 5 ml. of seed inoculum/ml. of fermentation medium. The fermentation flasks are grown for 5–6 days at a temperature of 28° C. on a Gump rotary shaker operating at 250 r.p.m. Maximum production of zorbonomycin in a flask fermentation is generally realized around the fifth day after which the titer of the antibiotic gradually drops off. In a typical shake flask fermentation, the shake flask beer assays 28.6 B.U./ml. of zorbonomycin after 4 days; 48 B.U./ml. of zorbonomycin after 5 days, and 21.4 B.U./ml. of zorbonomycin after 6 days of fermentation time. The fermentation assay used above is an agar diffusion-disc plate method using the microorganism *Bacillus subtilis.* The agar medium is buffered with 0.1 M phosphate buffer at a pH of 7.85. A biounit of activity (B.U.) is defined as that quantity of antibiotic necessary to achieve a 20 mm. zone of inhibition from a ½ inch disc treated with 0.08 ml. of test solution.

Part B: Extraction

Whole beer (5000 liters) from a scaled-up fermentation, as described above, is filtered with the aid of diatomaceous earth. The filter cake is discarded. The clear beer is passed through a column containing Amberlite XAD-2 resin (a non-ionic macro-porous copolymer of styrene cross-linked with divinylbenzene) at a flow rate of approximately 13 liters/minute. The spent beer is discarded. The column is washed with water and the aqueous wash is discarded. The column is then eluted with 440 liters of 5% aqueous acetone and the eluate fraction is discarded. The column is then eluted with 300 liters of 50% aqueous acetone and Fraction I is collected. The column is next eluted with an additional 100 liters of 50% aqueous acetone and Fraction II is collected. Fractions I and II are combined and adjusted to pH 8.5 with aqueous sodium hydroxide. This solution is concentrated to an aqueous solution *in vacuo.* The concentrate is then freeze-dried to give 3170 g. of a freeze-dried preparation of zorbonomycin assaying 2140–2400 K.p. units/mg. ("K.p. units/mg." refers to the potency obtained in a standard curve assay against the microorganism *Klebsiella pneumoniae.*)

The assay is conducted on a medium called Seed Agar (Baltimore Biological Laboratories, Baltimore, Md.) or Penassay Seed Agar (Difco Laboratories, Detroit, Mich.) which is adjusted to pH 9.5 before autoclaving. The medium is inoculated at 48° C. with 0.05% suspension of *Klebsiella pneumoniae* containing about $10^9$ cells/ml. The plate is incubated at 37° C. The standard and test materials are dissolved and diluted with 0.1 M pH 7.9 potassium phosphate buffer. Each test and standard solution is applied to four ½ inch paper assay discs (Schleicher and Schuell 740E) at 0.08 ml. per disc. The assay plates are then incubated at 37° C. for 16–18 hours. The four zones of inhibition for each solution are averaged, and the potencies of the test solutions are determined from a standard curve plotted on zone diameter vs. log concentration.

One $K.p.$ unit is defined as 1 mcg. of the reference standard/ml.

The above freeze-dried preparation of zorbonomycin is suspended in approximately 45 liters of absolute methanol. The mixture is filtered using diatomaceous earth as a filter aid. The filtrate is concentrated to a volume of 12 liters, adjusted to a pH of 6.2 (using 40 ml. of 12 N aqueous hydrochloric acid) and then concentrated again to a volume of 2900 ml. This concentrate is mixed with 1450 ml. of acetone. The precipitate formed is removed by centrifugation. The filtrate is mixed with 30 liters of acetone. The precipitated material is allowed to stand at room temperature for 12 hours; it is then isolated by filtration and washed with 8 liters of acetone followed by a wash with 6 liters of Skellysolve B (isomeric hexanes). The isolated material is dried in vacuo to give 520 g. of a preparation of zorbonomycin assaying 7400–11,700 K.p. units/mg. This preparation is then passed over a IRC–50 (cation exchange resin) chromatography column in the ammonium ion form. The internal diameter of the column is 6.2 cm. and 7 liters of IRC–50 are used to prepare the column. The zorbonomycin preparation, described above, 500 g., is dissolved in 25 l. of water and 10 l. of methanol. The solution is adjusted to pH 6.0 with aqueous hydrochloric acid. This solution is passed through the column at a flow rate of 150 ml./minute. The spent is collected in two fractions designated Spent-1 and Spent-2. The column is then washed with 60 liters of water. The aqueous wash is collected in three fractions designated Water-1, Water-2 and Water-3. The column is then washed with 16 liters of aqueous ammonia prepared by diluting concentrated ammonia 1:20. The effluent is collected in 4 liter fractions designated as Ammonia-1, -2, -3, and Ammonia-4. The column is then eluted with 30 liters of 5% aqueous ammonium chloride. The effluent is collected in 4 liter fractions. Fractions are designated as Ammonium Chloride-1, -2, etc. All fractions obtained are tested for bioactivity against *K. pneumoniae*, *B. subtilis*, and *S. aureus* on an agar diffusion-disc plate assay, as described above. The results of these tests are given in zone size wherein a paper disc of 6.35 mm. is used in the assay.

| Description | K. pneumoniae | B. subtilis | S. aureus |
|---|---|---|---|
| Starting solution | 29 | 39 | 35 |
| Spent-1 | 22 | 31 | 29 |
| Spent-2 | 22.5 | 35 | 30 |
| Water-1 | 21 | 32 | 26 |
| Water-2 | 13.5 | 23 | 17 |
| Water-3 | 12 | 21 | 15 |
| Ammonia-1 | 13.5 | | 18 |
| Ammonia-2 | 17 | | 16.5 |
| Ammonia-3 | 21 | | 24 |
| Ammonia-4 | 21 | | 23 |
| NH₄Cl-1 | 32 | 42 | 38 |
| NH₄Cl-2 | 23 | 31 | 30 |
| NH₄Cl-3 | 17 | 26 | 22 |
| NH₄Cl-4 | 15 | 23 | Traces |
| NH₄Cl-5 | 13 | 23 | 0 |
| NH₄Cl-6 | Traces | 23 | 0 |
| NH₄Cl-7 | 0 | 26 | 0 |
| NH₄Cl-8 | 0 | 23 | 0 |

Fractions Ammonium Chloride-1 through Ammonium Chloride-8 are combined and adjusted to pH 8.5. This solution is then passed through a column containing 2 kg. of Amberlite XAD–2 resin. The spent is collected in 8 4-liter fractions. All 8 fractions are inactive against *K. pneumoniae*, *B. subtilis*, and *S. aureus*. The column is then washed with 6 l. of water and twelve fractions of 500 ml. each are collected. These fractions are designated Water-1 to Water-12 successively; activity results follow:

| | Zone size (mm.) | | |
|---|---|---|---|
| | K. pneumoniae | B. subtilis | S. aureus |
| Water-1 | 0 | 12 | 0 |
| Water-2 | 0 | 0 | 0 |
| Water-3 | 0 | 0 | 0 |
| Water-4 | 23 | 33 | 22 |
| Water-5 | 27 | | 25 |
| Water-6 | 28 | | 25 |
| Water-7 | 28.5 | | 23.5 |
| Water-8 | 29 | | 21 |
| Water-9 | 29 | | 25 |
| Water-10 | 30 | 35 | 28 |
| Water-11 | | 32 | 29 |
| Water-12 | | 35 | 31 |

The column is then eluted with 6 l. of 50% aqueous acetone. The eluates are collected in two 3-liter fractions. The following pools are made. Each pool is concentrated to an aqueous solution (if needed) and the concentrate is freeze-dried. Pool I from aqueous fractions 5–8 yields 2.3 g. of relatively pure zorbonomycin. Pool II from aqueous fractions 9–12 yields 2.6 g. of relatively pure zorbonomycin. These preparations are isolated as blue-colored amorphous materials.

The above preparations of zorbonomycin are separated into pure preparations of zorbonomycin and zorbonomycin B by subjecting the preparations to CM-Sephadex chromatography. CM-Sephadex-C-25 (40–120 microns, Pharmacia Fine Chemicals, Inc., 175 g.) is mixed with 2.0 l. of 0.05 M NH₄Cl in water and adjusted to pH 7.3 with NH₄OH. The gel is allowed to swell overnight and then packed into a glass chromatography tube to a constant dimension of 4.7 cm. x 79 cm. with flowing 0.05 M NH₄Cl (pH 7.3). The preparations of zorbonomycin, described above, are combined (4.35 g.) and dissolved in 5.0 ml. of 0.05 M NH₄Cl (pH 7.5) solution and packed into the top of the prepared CM-Sephadex column, described above. This starting material is composed of a mixture of zorbonomycin and zorbonomycin B. Zorbonomycin is the chief component. Following the introduction of the starting material, the column is developed at a flow rate of 5 ml./minute with the following volumes and ionic strengths of developers.

Fractions (Volume=18 ml. each):
  1 through 65 (1170 ml. total) --- 0.05 M NH₄Cl in H₂O, pH 7.5.
  66 through 586 (9360 ml. total) -- .15 M NH₄Cl in H₂O, pH 7.5.
  587 through 886 (5382 ml. total) -- .30 M NH₄Cl in H₂O, pH 7.5.

Every fifth fraction is dip-spotted with 6.35 mm. assay discs on trays seeded with *B. subtilis* and incubated overnight at 37° C.

Column fractions and final preparations of zorbonomycin are analyzed by thin-layer chromatography. The thin-layer chromatography system is MN-Polygram Cel-300 (20 x 20 cm. Brinkmann Instruments, Inc., Westbury, N.Y. 11590) 0.1 M NH₄Cl in H₂O, pH 7.5 (NH₄OH) and bioautographed on *B. subtilis* seeded tray. Quantities of fractions applied to the cellulose films range from 2λ for the less potent *B. subtilis* fractions to as little as 0.1λ for the more potent fractions (fractions 440–490). Fractions 505–535 (identified as A) require 0.5λ. Analysis show that fractions 350–490 contain zorbonomycin in quantities roughly proportional to their *B. subtilis* activity. Based on thin-layer chromatography, *B. subtilis* zones of inhibition, and color, the greatest share and the most pure zorbonomycin is obtained in fractions 401–494, therefore, these fractions are combined. This zorbonomycin pool has a volume of 1650 ml. and shows U.V. maxima at 244 mµ (A=32.4) and 295 mµ (A=10.2). Based on the U.V. absorption at 244 mµ, this pool contains approximately 3.04 g. of pure zorbonomycin.

The pool of fractions 401–494, obtained as described above from the CM-Sephadex column, is passed through an Amberlite XAD–2 resin (200 ml.) at a flow rate of 8 ml./minute. The zorbonomycin is retained by the resin and the ammonium chloride effluent is discarded. [Excess reagents and impurities are removed from new Amberlite XAD–2 resin prior to its use in the purification of zorbonomycin as follows: The fine particles are first decanted and discarded with water. The remaining resin (200 ml.) is washed column-fashion with water (400 ml.), followed by acetone (800 ml.), followed by acetone-water (1:1, 400 ml.), and followed finally by water alone (800 ml.).] According to the blue color retained on the column, approximately 0.8 of the resin is used for the absorption of zorbonomycin. The Amberlite XAD–2 column (on which zorbonomycin has been absorbed) is then washed with 180 ml. of water. Zorbonomycin is then eluted with acetone-water (1:1, 250 ml.). The eluate is concentrated *in vacuo* to an aqueous solution which is clarified by filtration and freeze dried; yield, 2.31 g. of pure zorbonomycin.

Thin-layer chromatography of fractions 505–535 (identified as A), obtained from the Amberlite XAD–2 resin, described above, disclose the presence of another substance whose mobility is less than that of zorbonomycin. These fractions are faintly blue in color. Fractions 505–535 are combined (volume=530 ml., U.V. max. at 240 mµ, A=1.97, and at 290 mµ, A=1.54) and passed through 5 ml. of prepared Amberlite XAD–2 resin at a flow rate of 0.2 ml./minute. The effluent is discarded. The ammonium chloride solution which remains on the column is displaced with water and the antibiotic is eluted from the resin with 25 ml. of acetone-water (1:1). The eluate is concentrated *in vacuo* to an aqueous solution and freeze-dried; yield, 45 mg. of zorbonomycin B.

EXAMPLE 2

Copper-free zorbonomycin

Zorbonomycin (500 mg.) prepared as described in Example 1, is dissolved in 50 ml. of absolute methanol. Hydrogen sulfide is bubbled into the blue-colored solution of zorbonomycin until the blue color has been replaced by a dark brown color of the precipitated copper sulfide. The precipitated material is separated by filtration and discarded. The filtrate is concentrated to a volume of 10 ml. This solution is then mixed with approximately 1 l. of ether. The precipitated colorless, copper-free zorbonomycin is isolated by filtration and dried; yield, 371 mg. of copper-free zorbonomycin.

EXAMPLE 3

Copper-free zorbonomycin B

Zorbonomycin B (1.0 g.), prepared as described in Example 1, is dissolved in 100 ml. of absolute methanol. Hydrogen sulfide is introduced into the solution for 30 minutes. The precipitated copper sulfide is removed by filtration. The slightly yellow filtrate is then mixed with 1 l. of ether. Copper-free zorbonomycin B is then precipitated and isolated by filtration. This material is dried to give 800 mg. of copper-free zorbonomycin B.

EXAMPLE 4

Preparation of D-fucosamine

Whole beer (approximately 4700 liters), obtained from a zorbonomycin fermentation as described in Example 1, is filtered using 4% diatomaceous earth as filter aid. The cake is discarded. The clear filtrate (4500 liters) is mixed with 25 kg. of NaSul SS (a 50% solution of sodium dinonyl naphthalene sulfonate) and the mixture is slurried for 12 hours. Diatomaceous earth, 25 kg., is then added to the mixture and the resulting slurry is filtered over an additional 25 kg. of diatomaceous earth. The filtrate is discarded. The cake is slurried in 400 l. of methylene chloride, 200 l. of water, and 15 kg. of Aliquot 336 (tricaprylmethyl-ammonium chloride for 1 hour. The slurry is then filtered. The methylene chloride phase is separated and washed with $\frac{1}{10}$ of its volume of water. The water wash is added to the aqueous phase and the solution is adjusted to pH 6.0 and washed with $\frac{1}{3}$ of its volume of methylene chloride. The aqueous extract is then adjusted to pH 6.5, concentrated to 15 liters and freeze-dried. The dry residue was triturated with a minimum amount of absolute methanol. Material insoluble in methanol was separated by filtration and dried (339 g.). The methanolic filtrate is mixed with 4 volumes of acetone. The resulting precipitated material is isolated by filtration and dried; yield, 870 g. of material labeled "Material A." An additional 317.2 g. of material were obtained in the same manner as "Material A." This 317.2 g. plus 630 g. of "Material A" are combined to give 947.5 g. of material from which D-fucosamine is isolated by acid hydrolysis as follows: 10 g. of this material is dissolved in 200 ml. of 6 $N$ aqueous hydrochloric acid (other mineral acids, for example, $H_2SO_4$ and $H_3PO_4$ can be used). The solution is heated on a steam bath for 12 hours and then concentrated to dryness. The residue is dissolved in 150 ml. of water and the resulting strongly colored solution is decolorized with 4 g. of activated carbon. The decolorized solution is concentrated to a small volume (3 ml.) and mixed with 20 ml. of 95% aqueous ethanol. (Other lower alkanols, for example, methanol and butanol can be used). The resulting precipitated material (inorganic salt) is removed by filtration. The filtrate is concentrated to a viscous material which is then triturated with ethanol. The crystalline material which forms is isolated by filtration and dried; yield, 760 mg. The procedure described above is applied on 10 more grams of material to give 1.0 g. of material. This latter material is recrystallized from 10 ml. of water, 10 ml. of absolute ethanol, and 1 l. of acetone; yield, 850 mg. This 850 mg. is combined with the 760 mg., obtained as described above, and characterized by various physical and chemical tests to show the identity of the material to be that of D-fucosamine.

Analytical.—Found: C, 35.11; H, 6.84; N, 6.68; Cl, 18.79; O (by dif.) 32.58. Calc'd for: $C_{16}H_{13}NO_4 \cdot HCl$: C, 36.03; H, 7.07; N, 7.02; Cl, 17.82; O, 32.16.

Potentiometric tritration: Tritration in water shows the presence of a basic group with pKa of 7.3.

Melting point: Material turns dark at 170–172° (unc.) and decomposes completely at 190° C. (unc.).

Specific rotation: $[\alpha]_{25}^{D}$ +113° (c., 0.997, water) when the rotation is measured immediately after the preparation of the solution. The specific rotation decreases with time and reaches a constant value of +90° after 1 hour.

U.V. spectrum: No maxima between 220–400 mµ.

Color reactions: Gives positive ninhydrin and Fehling reactions.

Figure 4:
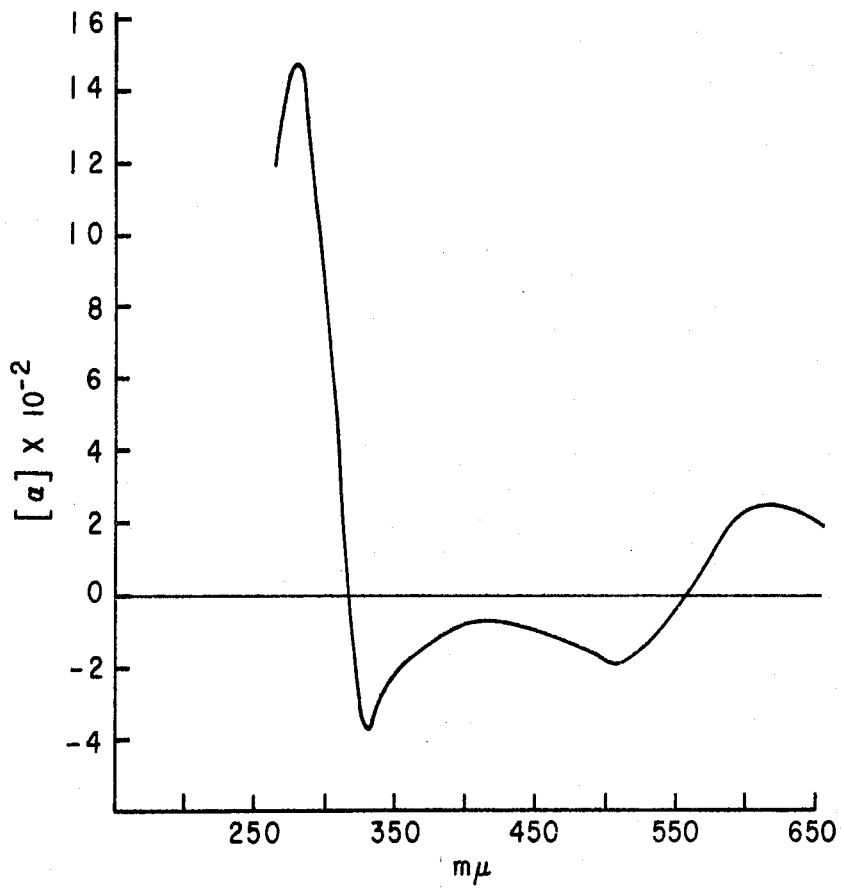
FIG. 4, optical rotary dispersion curve of zorbonomycin hydrochloride in methanol.
Figure 5:
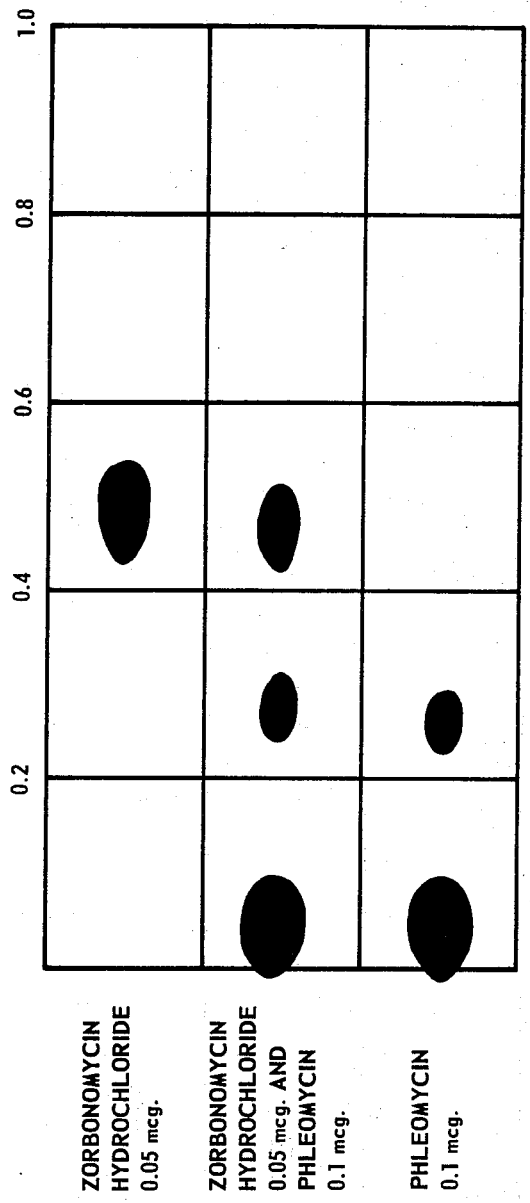
FIG. 5, thin-layer chromatography of zorbonomycin hydrochloride.

We claim:

1. Antibiotic zorbonomycin having the following characteristics:
    (a) is effective in inhibiting the growth of various fungi and Gram-positive and Gram-negative bacteria; and as its hydrochloride salt,
    (b) has a characteristic infrared absorption spectrum as shown in FIG. 1 of the accompanying drawing;
    (c) has a characteristic ultraviolet absorption spectrum as shown in FIG. 2 of the accompanying drawing;
    (d) has a characteristic optical rotary dispersion curve in water as shown in FIG. 3 of the accompanying drawing;
    (e) has a characteristic optical rotary dispersion curve in methanol as shown in FIG. 4 of the accompanying drawing;

(f) has a characteristic thin-layer chromatography pattern as shown in FIG. 5 of the accompanying drawing;

(g) has the following elemental analyses:
C, 42.48; H, 5.92; N, 16.16; S, 3.81; Cu, 3.86; Cl, 4.26; O, (by diff., 23.51);

(h) has a molecular weight of 677 (determined by vapor pressure measurement in absolute methanol);

(i) has an optical rotation $[\alpha]^D = +247°$ (c., 0.58, water); and (j) is highly soluble in water and methanol; has limited solubility in absolute ethanol and other lower alcohols; and is relatively insoluble in acetone, ethyl acetate, chlorinated hydrocarbons, and saturated hydrocarbon solvents; or its alkali metal, alkaline earth metal, amine, and acid addition salts.

Figure 6:
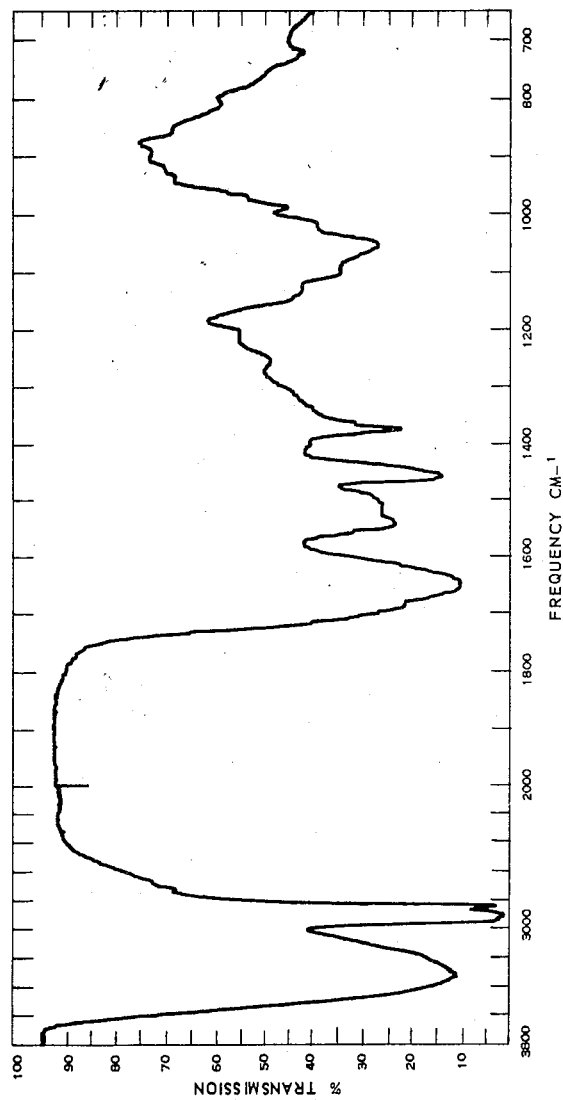
FIG. 6, infrared absorption spectrum of copper-free zorbonomycin hydrochloride.

2. The antibiotic copper-free zorbonomycin having the following characteristics:

(a) is effective in inhibition growth of various Gram-positive and Gram-negative bacteria; and as its hydrochloride salt;

(b) has a characteristic infrared absorption spectrum as shown in FIG. 6 of the accompanying drawing;

(c) has a characteristic NMR spectrum as shown in FIG. 7 of the accompanying drawing;

(d) has the following elemental analyses: C, 43.22; H, 6.55; N, 16.11; O, 24.45; S, 4.13; Cl, 4.14; Cu, 0.00619;

(e) has an optical rotation $[\alpha]^D = +19°$ (c., 0.99, water); and, (f) has a molecular weight of 543 (determined by vapor pressure measurements in methanol solution; or its alkali metal, alkaline earth metal, amine, and acid addition salts.

Figure 8:
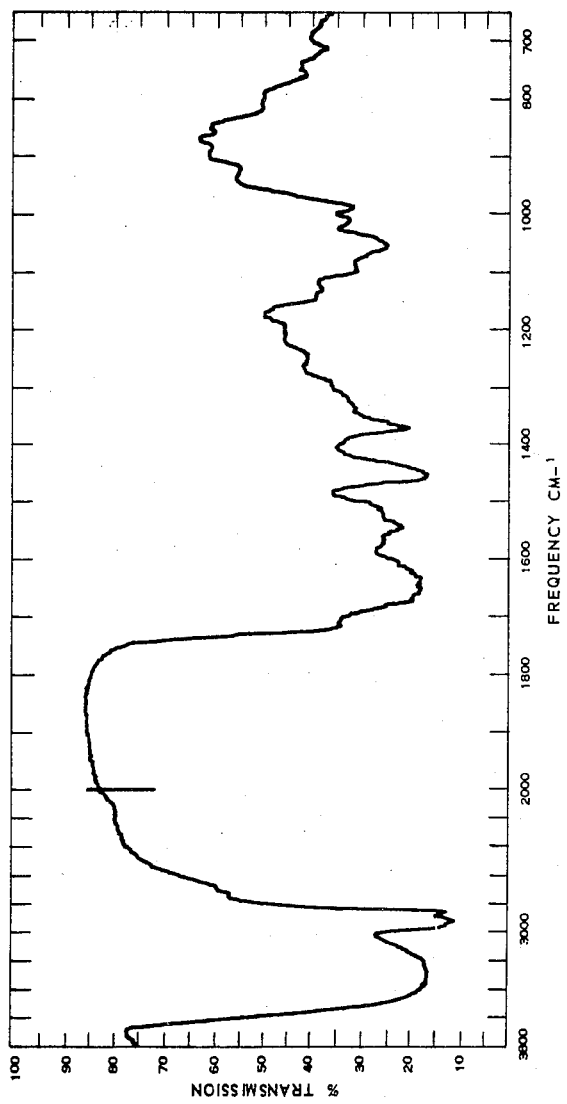
FIG. 8, infrared absorption spectrum of zorbonomycin B hydrochloride.
Figure 9:
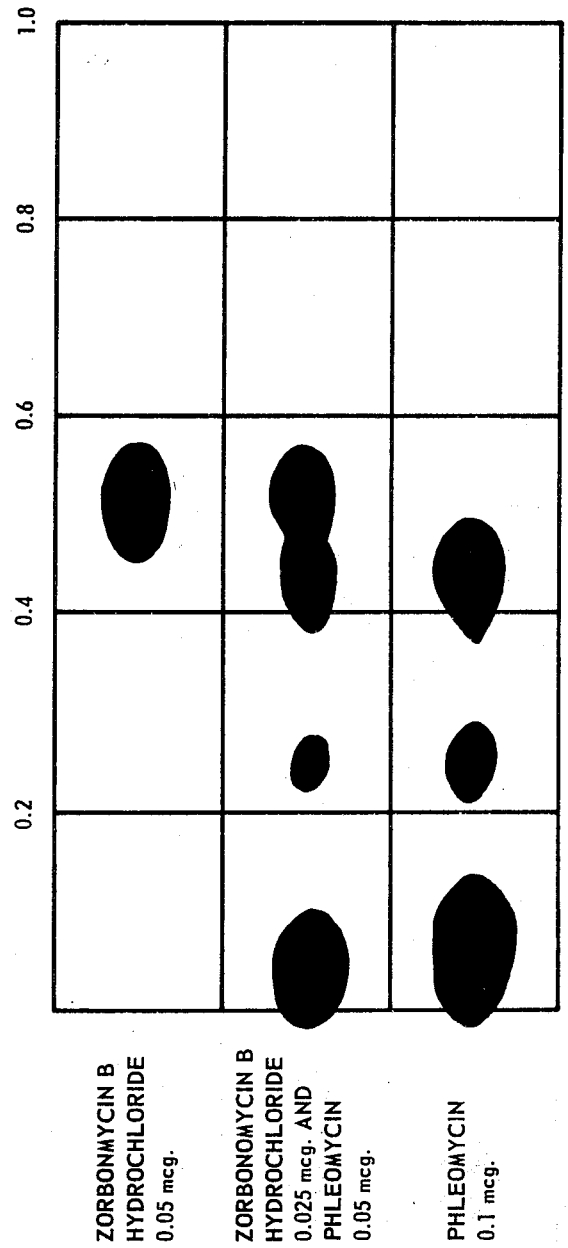
FIG. 9, thin-layer chromatography of zorbonomycin B hydrochloride.

3. Antibiotic zorbonomycin B, having the following characteristics:

(a) is effective in inhibiting the growth of various Gram-positive and Gram-positive bacteria; and as its hydrochloride salt, (b) has a characteristic infrared absorption spectrum as shown in FIG. 8 of the accompanying drawing;

(c) has a characteristic thin-layer chromatography pattern as shown in FIG. 9 of the accompanying drawing;

(d) has the following elemental analyses: C, 42.26; H, 5.43; N, 16.06; Cl, 4.32; S, 3.75; Cu, 3.81; O, 24.37 by (diff.); and, (e) has an equivalent weight of 860 (determined in glacial acetic acid using perchloric acid as titrant); or its alkali metal, alkaline earth metal, amine, and acid addition salts.

Figure 10:
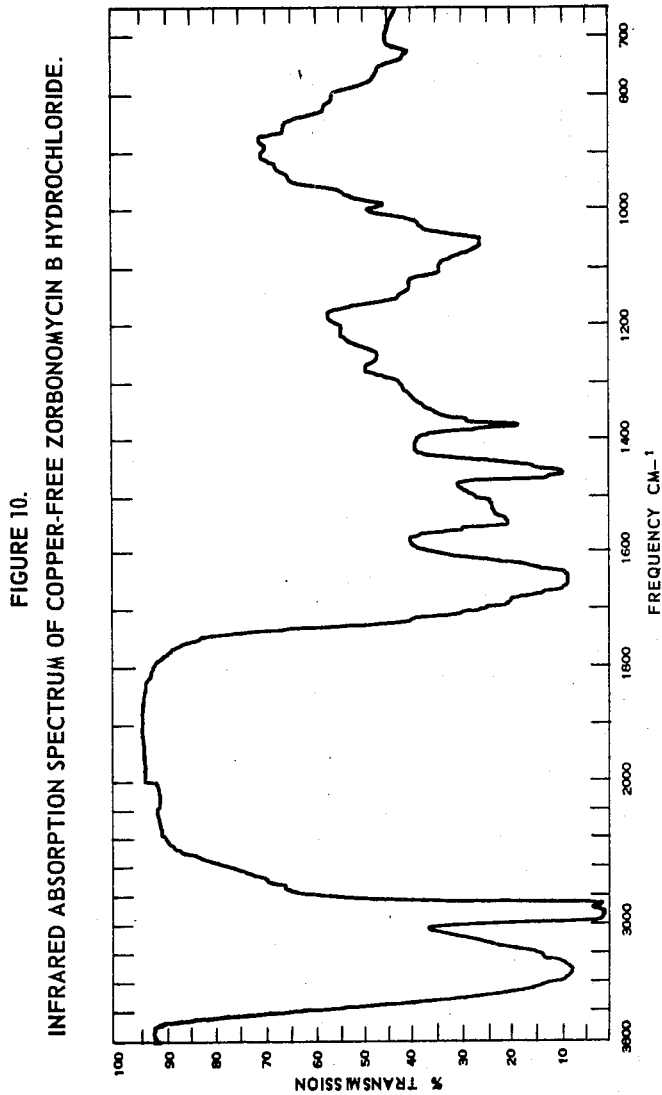
FIG. 10, infrared absorption spectrum of copper-free zorbonomycin B hydrochloride.

4. Copper-free zorbonomycin B having the following characteristics:

(a) is effective in inhibiting the growth of various Gram-positive and Gram-negative bacteria; and, as its hydrochloride salt, (b) has a characteristic infrared absorption spectrum as shown in FIG. 10 of the accompanying drawing;

(c) has a characteristic NMR spectrum as shown in FIG. 11 of the accompanying drawing;

(d) has the following elemental analyses: C, 43.73; H, 5.71; N, 16.20; Cl, 4.74; S, 4.26; Cu, 0.12.

(e) has the following U.V. spectrum in absolute methanol:

| $\lambda$ max.: | a |
|---|---|
| 235 (sl. sh) | 6.40 |
| 293 | 4.28 |
| 306 (sl. sh) | 3.22; |

(f) has a molecular formula $C_{58}H_{90-94}N_{19}O_{25}Cl_2S_2$; or its alkali metal, alkaline earth metal, amine, and acid addition salts.

5. The hydrochloride of zorbonomycin, according to claim 1.

6. The hydrochloride of copper-free zorbonomycin, according to claim 2.

7. The hydrochloride of zorbonomycin B, according to claim 3.

8. The hydrochloride of copper-free zorbonomycin B, according to claim 4.

9. The process for the production of zorbonomycin and zorbonomycin B which comprises cultivating *Streptomyces bikiniensis* var. *zorbonensis* in an aqueous nutrient medium under aerobic conditions until substantial antibiotic activity is imparted to said medium by the production of zorbonomycin and zorbonomycin B.

10. A process according to claim 9, which comprises cultivating *Streptomyces bikiniensis* var. *zorbonensis* in an aqueous nutrient medium containing a source of assimilable carbohydrate and assimilable nitrogen, under aerobic conditions, until substantial antibiotic activity is imparted to said medium by the production of zorbonomycin and zorbonomycin B, and isolating zorbonomycin or zorbonomycin B.

11. A process according to claim 10 which comprises filtering the medium, contacting the filtered broth with a non-ionic micro-porous copolymer of styrene crosslinked with divinylbenzene resin, and eluting zorbonomycin or zorbonomycin B from said resin.

References Cited
UNITED STATES PATENTS

| | | | |
|---|---|---|---|
| 3,155,581 | 11/1964 | Pinnert et al. | 424—117 |
| 3,395,220 | 7/1968 | Bergy et al. | 424—117 |

JEROME D. GOLDBERG, Primary Examiner

D. M. STEPHENS, Assistant Examiner

U.S. Cl. X.R.

195—80; 424—124